May 22, 1945. M. O. RANOE 2,376,554
NINE POSITION AUTOMATIC PHORIAMETER
Filed April 13, 1944
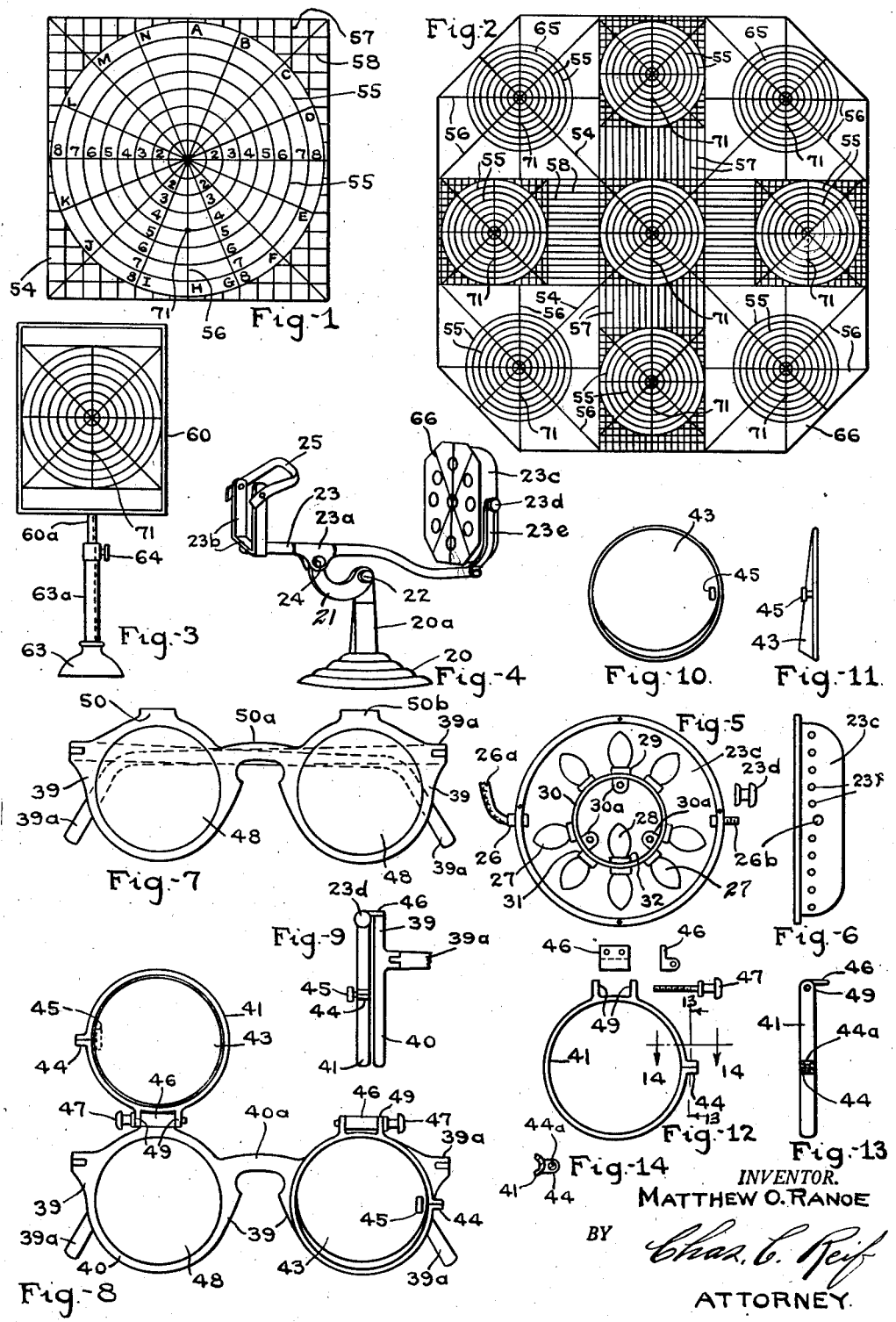
INVENTOR.
MATTHEW O. RANOE
BY Chas. C. Reif
ATTORNEY.

Patented May 22, 1945

2,376,554

UNITED STATES PATENT OFFICE 2,376,554

NINE POSITION AUTOMATIC PHORIAMETER

Matthew O. Ranoe, Minneapolis, Minn.

Application April 13, 1944, Serial No. 530,780

7 Claims. (Cl. 88—20)

This invention relates to an optical diagnostic instrument. The instrument is designed to test the eyes of patients and to enable the person making the test to determine what is abnormal and thus attempt to prescribe some definite remedy. While various instruments have been designed for testing the eyes to determine muscular imbalances, in the opinion of applicant, they have been based upon faulty theories or principles.

The instrument of this invention is constructed in line with the basic principles set forth in applicant's prior Patent No. 2,139,850, granted Dec. 13, 1938, on "Optical fusionmeter." These principles may be briefly stated as follows:

*First.*—The human eyes are substantially a pair of mechanical spheres having rotating movement within their respective sockets, said movements being caused by substantially four muscles known as the recti muscles.

*Second.*—In the coordinated use of the two eyes for visual purposes the two must at all times be directed to the same visual point. One image should be seen, or in other words, the image formed on the retina of each eye must fuse into one. This could be called fusional effort of the eyes. But this has heretofore been commonly but erroneously termed "convergence" of the internal recti muscles only.

*Third.*—The two eyes being located more than two inches apart, thus having separate centers of rotation, it becomes apparent that the only point of fusion brought about by the use of identical corresponding muscles of the two eyes would be a fused image seen on an imaginary vertical line located midway between the two eyes. It is apparent that at all other points of fusion spaced from said imaginary line identical corresponding muscles cannot be equally employed or acting with equal movement. On the other hand, said muscles are acting with high and constantly varying degrees of inequality or with great difference in their contractual movements.

*Fourth.*—It is a fact that eyes are seldom used in such a manner that corresponding muscles of the eyes receive an equal amount of use, work or strain. Furthermore, in many occupations such as bookkeeping, typing, comptometer work and the like, the eyes are used almost exclusively in an oblique or diagonal course or direction for several hours. This demands unequal work or strain of corresponding identical muscles and will result in ocular muscle imbalance. Resulting symptoms are often of such obscure nature as to challenge the most expert diagnostician.

*Fifth.*—The great majority of ocular imbalances (phorias) and "muscle trouble" are directly brought about by the unequal demand upon corresponding eye muscles either through faulty ocular habits or by types of eccentric work.

The greatest difficulty experienced in attempting to determine ocular deviations (phorias) has been to actually measure the true phoria combinations without thereby disrupting the abnormal status we seek to interpret. The common method previous has been to place many prisms of varying strength before the eyes in the process of attempted measurement. It will be readily seen that this automatically frustrates the very object which it is sought to obtain, namely; the true prevailing muscle status of the eyes.

The mechanical functions of the human eyes are substantially of a twofold nature, namely; a coordinated directional effort of the four muscles of each eye called the recti muscles, to place the image of each eye on an identical corresponding spot on the retina, commonly called the fovea, thus fusing the two images into one. This function as above indicated, has been and still is called "convergence," but has been exclusively allocated to the function of the identical corresponding muscles located on the nasal side of each eye, known as the internal recti muscles. The functions of the three other recti muscles of each eye, have been ignored as having any part in fusional effort (called convergence).

The second coordinated function of the human eyes is to so regulate the focal mechanisms of each eye as to maintain a maximum clearness of sight within each eye at all points of "fusion" over the entire visual field. This is referred to generally as the act of accommodation. This function has also been calculated exclusively on the line midway between the two eyes, which is wholly inadequate for the diagnosis of coordinated ocular functions.

However, through lack of scientific instruments adaptable to the actual demonstration of physiological optics by the early investigators in ophthalmological science, speculative calculations were resorted to instead of scientific demonstrations. This resulted in the faulty assumption that the acts of accommodation and internal recti convergence were definitely associated and linked together in a more or less fixed ratio. Then subsequent authors and teachers as well as optical scientists, through traditional respect for early contributors, merely accepted the former faulty assumptions and assertions. Consequently we have handed down to us from generation to generation the well known faulty and inadequate definitions which may be found in all of our optical as well as medical dictionaries, as for instance, "convergence is affected by an equal and simultaneous contraction of both internal recti"—Fuchs. Textbook of Ophthalmology by Duane, p. 287, par. 299. And the Lewis' Ophthalmic Dictionary and Encyclopedia, p. 62, states in part: "For a pair of normal eyes to view an object at a given distance the same amount of accommodation and convergence will be required. And continuing: "And if the object was brought nearer the accommodation and convergence would increase in an equal amount."

Optical analyses and diagnoses of ocular functions and their imbalances has in a sense revolved about the act of accommodation and its alleged "fixed relationship" with the "simultaneous contraction" of the internal recti muscles. However, as those two functions are actuated and energized from the same nerve nucleus through their respective cranial nerves, namely; the third cranial nerve, no universally accepted procedure or method of differential diagnosis has ever been devised. The result is that independent groups of practitioners have adopted various and diverse methods attempting to ascertain whether the cause of "phorias" (muscular imbalances) lies in the mechanism of accommodation or in the convergence effort of the internal recti muscles of the eyes. However, these methods have attained no definite dependability and no theory of practical application has resulted.

Phoria is a term applied in optical systomatology to the action of muscles in pulling the eye (tending) away from a normal position while under a so-called phoria test. There are generally speaking, four distinct directions of tending or deviation, namely; right, left, up or down of each eye independently of the other eye together with tendings along diagonal meridians between the vertical and horizontal as for instance, along the axes of 45 degrees and 135 degrees. The cause of such phoria (tending) of each eye obviously must come from an unequal functioning between opposing commonly called antagonistic muscles of each eye because the four recti muscles which direct the versions or movements of the organ have substantially an equal share of work or physiological effect in directing the movements of the organ providing the work is distributed equally in all directions from a point located directly in front of the eye and on a level with the pupil thereof. This same rule of course, holds good for each eye respectively.

However, in a great variety of occupations the work of the eyes must be carried on in a diagonal plane and to one side of the median for hours at a time and without compensatory change and this obviously must require a continuous overextension of muscle fibers in one of the recti muscles while in the opposing muscle there will be a continuous over-contraction of muscle fibers, which if continued to the point of fatigue, will produce a temporary functional inequality between such muscles resulting in an oblique or diagonal phoria and if prolonged for a longer period of time, will produce a permanent diagonal muscular inequality sufficient to cause disability of coordinated work between the two eyes. Moreover added to the above, it will be noted that the companion eye under the above situation will develop just the opposite muscular deficiency because some of the identical corresponding muscles of the two eyes are obliged to carry on just the opposite function of overextension and over-contraction of muscle fibers on account of not having the same points or centers of rotation.

Aniseikonia is a term given to a condition where ocular images are of unequal size as viewed by the two eyes.

With the above in view it is an object of this invention to provide an instrument by means of which a correct measurement of ocular deviations called "phorias" can be made not only at a position located directly between the eyes but in varying positions covering the entire visual field.

It is a further object of the invention to provide an instrument by means of which a differential measurement of functional equality or inequality of all corresponding recti muscles between the two eyes can be made in various positions comprising nine different positions which cover the entire visual field.

It is another object of the invention to provide an instrument for measuring ocular deviations so that exact comparisons may be made in terms of prism units, between internal recti muscles in their effort to attain coordination for any and all positions required in all types of work.

It is still another object of the invention to provide an instrument for accurately and scientifically demonstrating and comparing the size and shape of ocular images to determine any existing abnormality by first superimposing one image upon the other and then by means of instrument gradually moving one image away from the other for direct minute comparison.

Another object of the invention is to provide an instrument for making a dynamic test with a chart a comparatively short distance from the eye and also making a static test with the chart a much greater distance from the eye as from ten to twenty feet from the patient.

These and other objects and advantages of the invention will be fully set forth in the following description made in connection with the accompanying drawing in which like reference characters refer to similar parts throughout the several views and in which:

Fig. 1 is a view in plan or front elevation of a chart forming part of the device;

Fig. 2 is a view in plan or front elevation of another chart used;

Fig. 3 is a view in front elevation of the chart shown in Fig. 1 mounted on a suitable support;

Fig. 4 is a perspective view of the device;

Fig. 5 is a view in front elevation of a lamp casing used;

Fig. 6 is a view in side elevation of said lamp casing as seen from the right of Fig. 5;

Fig. 7 is a view in front elevation of a prism holding frame for the eyes;

Fig. 8 is a front view of the frame shown in Fig. 7 with some parts in different positions;

Fig. 9 is a view in side elevation of the frame shown in Fig. 8;

Fig. 10 is a view in front elevation of a prism used;

Fig. 11 is a view in side elevation as seen from the right of Fig. 10;

Fig. 12 is an exploded view in front elevation of parts of the frame shown in Fig. 8;

Fig. 13 is a view in vertical section taken on line 13—13 of Fig. 12 as indicated by the arrows; and Fig. 14 is a horizontal section taken on line 14—14 of Fig. 12.

Referring to the drawing an instrument is shown comprising a base member 20 which will be of rather heavy construction, the same being illustrated as of pyramidal form having a central upstanding standard 20a. A bracket 21 has arms extending at each side of standard 20a at the top portion thereof and a tightening screw 22 extends through said arms and through said standard and pivotally connects the same. Bracket 21 can thus be swung about the axis of screw 22 and held in different positions. Bracket 21 has an end portion which is apertured to have extend therethrough a screw 24 also extending through a bracket 23a connected to or forming part of a frame 23. Bracket 23a is connected to the elongated control bar-like part of frame 23 and can be oscillated about and held in position by screw 24. Frame 23 has upstanding arms 23b at one end to which is adjustably secured a bow or yoke member 25 having a curved portion against which the forehead of the patient may rest. Frame 23 at the end opposite bar 23b carries a casing 23c. The front of this casing is constructed and arranged to support the chart shown in Fig. 2. Casing 23c has a central or annular frame 30, fastened to casing 23c by projecting standards 30a and supporting a plurality of circumferentially spaced lamp sockets 31 adapted to receive electric lamp bulbs 27. Another socket 32 extends inwardly from frame 30 and is adapted to receive a lamp bulb 28. Casing 23c is provided with hubs 26 and 26b, the latter being supplied with a screw cap 23d at its sides supported in the top of yoke arms 23e upstanding from one end of frame 23. Casing 23c is provided with a plurality of circumferentially spaced holes 23f.

A frame designated generally as 40 is provided which is of the general form of a spectacle frame. This frame has a central nose piece 40a and substantially annular portions 39 at each side of said nose piece. Each portion 39 may be provided with a tinted lens 48 such as one of a green or light blue color. This accentuates the appearance of an illuminated object on certain charts used. The lenses 48 however, are not necessary. Members 39 have lugs at their remote sides to which are pivoted the usual bows 39a adapted to engage over the ears of the patient. Each frame 40 has formed thereon or secured thereto an elongated lug or hinge 46 at its upper end apertured to have extend therethrough a headed screw 47 which also extends through spaced lugs 49 adapted to be disposed at either end of lug 46 and which are threaded to receive bolt 47. Lugs 49 are secured to an annular frame 41 extending about and holding a prism lens 43. Each lens 43 has secured thereto a lug or small handle 45 by means of which it may be rotated in frame 41.

In Fig. 1 a chart 54 is shown and while this might take various forms, in the embodiment of the invention illustrated it is shown as square. Said chart is formed with a series of concentric circles 55 about the center thereof and these as shown, are numbered from the center outwardly. Said chart is also provided with a plurality of circumferentially and equally spaced radial lines 56 and these are designated with letters of the alphabet. Outside of the largest circle the chart is provided with vertical lines 57 and horizontal lines 58 equally spaced. The lines 55 are spaced a distance representing one diopter. This is also true of the spacing of lines 57 and 58.

In Fig. 3 the chart shown in Fig. 1 is shown as mounted in a rectangular frame 60 and it will be so mounted that it can be moved upwardly and downwardly therein. Frame 60 is provided with a supporting stem 60a which is received in the standard 63a of the base member 63. A set screw 64 extends through the standard 63a and is adapted to hold the stem 60a in different positions. The chart shown in Fig. 3 will have at its rear a lamp casing similar to the casing shown in Figs. 4 and 6. An electrical conductor cord 26a extending from this casing is shown.

In Fig. 2 another chart used with the instrument is shown. While this chart might have various forms, in the embodiment of the invention illustrated it is shown as formed as a square with the corners bevelled or cut away to form an irregular octagon. The chart shown in Fig. 2 has at its center the chart shown in Fig. 1. Similar charts are disposed at either side and at the top and bottom of said central chart. The horizontal and vertical lines indicated in Fig. 1 as 57 and 58 are continued between the charts at either side of and above and below the central chart shown in Fig. 2. The zone covered by these lines thus forms a cross disposed centrally of the chart. In addition to the five parts already mentioned similar to the parts shown in Fig. 1, the chart shown in Fig. 2 is also provided with corner portions 65. These have their centers on 45 degree diagonals 54 passing through the center of the chart. They comprise the concentric circles 55 and the radial lines 56 shown in Fig. 1. The radial lines 56 are continued beyond ends 55 as shown. There are thus nine of these circular portions in the chart shown in Fig. 2. Said chart is designated generally as 66. In the chart shown in Fig. 1 and in each of the circular portions of the chart 66 shown in Fig. 2, there is an object 71. This is located four spaces below the center of the central vertical line. This object constitutes an aperture in the chart through which the light from the lamps 27 and 28 may shine. This line will be of a lighter tint made either by colored bulbs or by a colored screen or diaphragm. The design of the aperture may vary and thus be either a round, square, star-shaped or other shaped hole.

The prism lenses 43 in practice have been made of red glass or red material. The prisms however, may be made with other colors. The surface of the charts shown in Figs. 1 and 2 will be made of a color complementary to the color of the prism. Thus if a red lens is used for prism lens 43 the surface of the chart will be the appropriate shade of blue. The lines on the chart are of a color contrasting with the color of the surface of the chart and these lines will be preferably of a shade similar to the color of lens 43. If a red lens is used for the prism lens 43 then the lines on the chart will be of an appropriate color of red.

In the operation of the device two tests are usually made, namely; the dynamic test and the static test. In making the dynamic test the chart shown in Fig. 2 as stated, is placed on the frame 23. The frame 40 is placed on the patient and the patient will be positioned so that his eyes are about sixteen inches from chart 66 by engaging the bracket 25. The chart 66 can be used on a flat surface or it could be on a concave surface having a radius of sixteen inches, corresponding to the focal distance used in the test. The prism 43 used is of suitable power to disassociate fusion and is made from a certain tint as ruby red. Alternately a tinted disc may be used over a clear glass prism. This prism is placed with its base downward or at the bottom. The lamps in casing 23c are illuminated so that the light shines through the aperture, object or design 71. There are, as shown, nine lamps and these are arranged so that one lamp is located directly behind each of the objects or apertures 71. As stated, the lamps will be properly colored or a diaphragm will be placed over the aperture to give the desired color or tinted lenses 48 in frame 40 may be combined or substituted. The law of complementary colors is made use of and the color of the background of chart 66 as stated, is of a certain bluish tint when a red prism 43 is used. Other suitable colors may be used if a different colored prism 43 is used. With the frame 40 in position the frame 41 is swung down about the axis of screw 47 in front of the eye to be tested. The prism on the other eye remains up so that there is no prism in front of the other eye. The central circle or series of circles is first used. The object 71 is located a distance below the center of the chart circle or below the central horizontal line the exact distance represented by the deflecting power of the prism used in the frame 40. In the particular case illustrated, the prism used is four diopters (prism diopters as used in optical work). The space intervening between the center of the circle and the aperture is thus also four prism diopters. The distance between adjacent lines when the chart is used at a distance of sixteen inches from the patient as in the dynamic test, in practice is substantially $\frac{5}{32}$ of an inch. This represents approximately 1 prism unit of muscle work. Assuming that the left eye is being tested and the prism 43 which in this instance is of a red color, has been placed over this eye. Due to the complementary color arrangement this eye does not see the chart colored but sees only a plain or blank area which becomes invisible to that eye but sees the object 71 appearing red against the blank background of the chart, which the other eye sees in a normal manner. The lines on the chart are not seen by the left eye or the eye looking through the prism due to the color of the lines and prism 43 so that the chart appears entirely blank to the left eye being tested. A normally balanced eye would see the red light or object 71 directly on the horizontal line or center of the circle on the chart. This would indicate a normal vertical balanced eye. However clinical experience sems to indicate that in the dynamic test, four to six prism units of "exophoria" (outwardly tending of the eyes) may be considered as a normal finding. This matter of course must be left to the best judgment of the examiner. Due to the laws of complementary colors the object or aperture 71 is intensified over the bluish background seen by the uncovered right eye and this makes a pronounced dissimilarity between the images of this object as seen by the two eyes. The left eye sees only a red object on a plain background and this eye takes its natural position. The image seen by the left eye can be located on the chart and relative to the lines thereon on the right eye. The "tending" or deviation of the disassociated images of object 71 are thus observed on the chart. The deviation of the eye being tested can be directly read in prism diopters or prism units as indicated by the spaced or graduated lines on the chart by the eye having normal vision or having nothing thereover. The test is thus in a sense automatic and the deviation can be at once observed and designated by the numbered and lettered lines in the chart. In practice the full size of the chart shown in Fig. 2 is substantially 10¼ inches in its vertical and transverse dimension. By successively using the various objects 71 and the different series of circles in the different circles on this chart 66 shown in Fig. 2, the deviation of the eyes for all positions, that is to the left or right and upwardly and downwardly, may be readily observed. When these deviations are seen the examiner can at once tell what kind of abnormal work or in what kind of oblique or unusual positions the eyes have been used. Exercises, treatments, changes in the positions of the patient's work, etc., can then be prescribed for correction even to change of occupation in severe cases. A plain glass of light green or blue as stated, may be used over both eyes. This tends to soften the images and prevent a glare effect, but otherwise does not influence the test.

In the static test the chart shown in Fig. 1 is used and this is placed at quite a distance from the patient, say ten, fifteen or twenty feet. The size of the chart will be proportionately larger according to the distance. When the chart is used at a distance of ten feet the spaces between the lines will be about 1⅛ inches to represent one prism unit or diopter. The full size of the chart at this distance is substantially fifteen by twenty inches. The object or aperture 71 is approximately ¼ of an inch in transverse dimension. This static test is very important and reveals many findings never before even attempted. As for instance, the examiner will know instantly if the patient is doing any type of eccentric work such as comptometer work, typing from notes on a table, bookkeeping, bad reading habits, reading in bed, etc. When the patient's eyes are normally balanced for infinity the eye being tested and having the colored prism thereover should see the colored light or object 71 appearing directly in the center of the circle. The eye being tested as stated sees only a blank chart. Each eye must be tested separately and each one will thus have the colored prism placed thereover, that is, first one and then the other. As before, the uncovered eye readily locates the image seen by the eye looking through the prism by the lines on the chart. This will reveal which eye is affected and to what extent in both the vertical and horizontal meridians as well as the combination of both. Often times one eye will appear normal while the other eye will show several prism diopters deviation in a combination of both meridians.

The second diagnostic feature of the "nine position automatic phoriameter" which the device is called, is to accurately and scientifically demonstrate and compare the size of ocular images of the two eyes by the unique and direct method of first superimposing one image on the other and then gradually moving one of the images, which are colored, away from the other. This procedure may be done in two opposite directions, that is upwardly and then downwardly. The colored prism 43 may be placed exactly base in or base out (which ever way the fusion is most easily obtained). The prism is then rotated by means of the projection or handle 45 and if it is rotated to move its apex downwardly it lowers the darker image to a position below the other. The darker image is seen by the eye having the prism thereover. When the prism is placed over the other eye the darker image is then viewed by or alternated to the other eye so that a number of various comparisons may be made to minutely distinguish any dissimilarity which may be present in the images as viewed by the two eyes.

With the dynamic test as already described, the findings will determine several important things which will be of the utmost importance to the examiner. Some of these will show wherein the greater fatigue, strain or irritation occurs whether in the third nerve nucleus or in the sixth nerve nucleus. It is also important that in the nine position test using the chart shown in Fig. 2, each recti muscle may be compared with its identical corresponding muscle of the companion eye. This can first be done in a median position using the object 71 in the center of the chart where the convergence is always equal and subsequently in the other eight positions covering the entire visual field. These tests will cover various combinations as for instance, where accommodation is employed in combination with the external rectus without any participation of the internal rectus muscle as well as with the varying degrees of accommodation in combination with the internal rectus muscle. Such diagnosis will enable the examiner to correctly and scientifically prescribe such remedies as are necessary for the amelioration of each symptom instead of as formerly attempted, the theoretical calculation of unpredictable results.

From the above description it will be seen that measurements and observations can be taken in the described tests which have not previously been done. In the prior practice in making the static test, prisms of varying degrees of power were placed before the deviating eye to ascertain how many degrees or prism units it required to bring the two images to the same vertical or horizontal line. Such procedure cannot properly be classed as a true static test, nor will it ever reveal a true static finding because as soon as said prisms are placed before either eye excitation of the fusion center is immediately caused and a false finding is always the result since nature makes a dynamic effort to fuse the two images. With the present apparatus the deviation of each eye is accurately determined.

As stated, the findings which can be made with the present invention reveal the real causes of abnormality of the eyes and the abnormal condition of the recti muscles. Measurements can then be prescribed for the alleviation of the trouble. This is the only real and scientific manner in which to treat the trouble. Some persons due to the conditions of their work, have caused the muscles to get into such conditions that normal sight was impossible. Persons often have nervous breakdowns. With the present invention the real cause of the trouble is ascertained and as stated, the proper procedure can be followed to correct the difficulties.

From the above description it will be seen that I have provided an entirely novel and highly useful and efficient device. The same has been actually demonstrated in actual practice, in experiments over quite a period and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

This application is a substitute for and continuation in part of applicant's copending application S. N. 403,387, filed July 21, 1941, on "Nine position automatic phoriameter."

What is claimed is:

1. A device for testing the eyes comprising a chart having a zone with spaced lines thereon arranged about a central point of said zone, means for holding a colored prism in front of either eye of the patient, the other eye having a natural view, an object on said chart visible to both of said eyes, said prism being constructed and arranged to displace the image of said object seen by the eye having a prism in front of it to prevent fusion of the images seen by said eyes, said chart having a background of a color complementary to the color of said prism and said lines being of a contrasting color and one not visible through said prism whereby said chart is seen as a blank surface by the eye having the prism in front of it and a colored image only is seen by the eye looking through said prism so that the image seen by the latter eye can be located with respect to said spaced lines and central point on the chart by the eye having the normal view.

2. A device for testing the eyes comprising a chart having a zone with spaced lines thereon arranged about a central point of said zone, means for holding a colored prism over either eye of the patient, the other eye having a natural view, an object on said chart visible to both of said eyes, said prism being constructed and arranged to displace the image of said object seen by the eye having the prism thereover to prevent fusion of the images seen by said eyes, said chart having a color complementary to the color of said prism and said lines being of a color substantially the same as the color of said prism whereby said chart appears only as a blank surface to the eye having the prism thereover and said latter eye sees only an image of said object having the color of said prism and the image seen by said latter eye can be located with respect to said spaced lines and central point on the chart by the eye having a natural view and the phoria of said eye having the prism thereover thus determined.

3. The structure set forth in claim 2, said object on said chart being located a distance from said central point equal to the displacement of the image by said prism.

4. The structure set forth in claim 2, said chart also having additional similar zones above, below and at each side of said zone, each having spaced lines arranged about a central point of the respective zone and each zone having an object therein.

5. The structure set forth in claim 2, said chart also having additional zones with their centers substantially on 45 degree diagonals extending through the central point of said first mentioned zone both above and below said first mentioned zone and said chart also having zones above, below and at either side of said first mentioned zones whereby there are nine zones, all of said zones having a central point with lines arranged thereabout and an object in each of said zones.

6. The structure set forth in claim 2, said prisms being rotatable about a substantially central axis substantially perpendicular to the surface of said prism.

7. The method of testing eyes for phoria which comprises alternately testing said eyes by placing a colored prism first over one eye and then over the other with one eye having an unobstructed view, viewing an object on a chart with both of said eyes, said chart having a central point with lines arranged thereabout for locating an image thereon, said chart being of a color complementary to the color of said prism and said lines of a color corresponding to the color of said prism, displacing the image seen by one eye by said prism through which it looks to prevent fusion of the images of said eyes and locating on said chart the image seen through said prism by the eye having the unobstructed view with reference to said central point and lines thereabout.

MATTHEW O. RANOE.